United States Patent
Duffett-Smith et al.

(10) Patent No.: US 7,978,136 B2
(45) Date of Patent: Jul. 12, 2011

(54) ASSOCIATING A UNIVERSAL TIME WITH RECEIVED SIGNAL

(75) Inventors: Peter James Duffett-Smith, Cambridge (GB); Paul Hansen, Cambridge (GB); Anthony Richard Pratt, Cambridge (GB)

(73) Assignee: Cambridge Positioning Systems Limited, Cambridge (GB)

( * ) Notice: Subject to any disclaimer, the term of this patent is extended or adjusted under 35 U.S.C. 154(b) by 251 days.

(21) Appl. No.: 12/225,860

(22) PCT Filed: Mar. 13, 2007

(86) PCT No.: PCT/EP2007/052371
§ 371 (c)(1),
(2), (4) Date: Oct. 28, 2008

(87) PCT Pub. No.: WO2007/113086
PCT Pub. Date: Oct. 11, 2007

(65) Prior Publication Data
US 2009/0273518 A1    Nov. 5, 2009

(30) Foreign Application Priority Data
Apr. 4, 2006    (EP) .................................. 06112194

(51) Int. Cl.
*G01S 1/24*    (2006.01)
*H01Q 3/00*    (2006.01)
(52) U.S. Cl. ........................ 342/387; 342/360
(58) Field of Classification Search .............. 342/360, 342/387
See application file for complete search history.

(56) References Cited

U.S. PATENT DOCUMENTS

| | | | |
|---|---|---|---|
| 4,754,465 A * | 6/1988 | Trimble | 375/376 |
| 5,225,842 A | 7/1993 | Brown et al. | |
| 5,365,516 A | 11/1994 | Jandrell | |
| 5,663,735 A | 9/1997 | Eshenbach | |
| 5,812,087 A * | 9/1998 | Krasner | 342/357.4 |
| 5,841,396 A * | 11/1998 | Krasner | 342/357.75 |
| 5,945,944 A | 8/1999 | Krasner | |
| 6,052,081 A * | 4/2000 | Krasner | 342/357.28 |
| 6,084,547 A | 7/2000 | Sanderford et al. | |
| 6,150,980 A * | 11/2000 | Krasner | 342/357.29 |
| 6,429,815 B1 | 8/2002 | Soliman | |
| 6,445,927 B1 | 9/2002 | King et al. | |

(Continued)

FOREIGN PATENT DOCUMENTS
EP    0 303 371 A1    2/1989
(Continued)

*Primary Examiner* — Thomas H Tarcza
*Assistant Examiner* — Frank McGue
(74) *Attorney, Agent, or Firm* — Roylance, Abrams, Berdo & Goodman, LLP

(57) ABSTRACT

A method of associating a universal time with time of arrival information of an identified component of a signal at a terminal of a radio positioning system is disclosed. In the method a marker signal with an associated universal time tag is obtained from a timing device (or the marker signal is obtained from an independent oscillator and a universal time tag assigned to the marker signal), and the time or phase relationship between the marker signal (or between the time of arrival information of said identified component respectively) and the oscillator is measured. The time of arrival information of said identified component relative to the oscillator is determined and the universal time corresponding to the time of arrival information of said identified component is calculated from said universal time tag and said measured time or phase relationship, before the calculated universal time is associated with said time of arrival information.

23 Claims, 4 Drawing Sheets

U.S. PATENT DOCUMENTS

| | | |
|---|---|---|
| 6,603,978 B1 | 8/2003 | Carlsson et al. |
| 6,865,380 B2 | 3/2005 | Syrjärinne |
| 7,043,265 B2 * | 5/2006 | Nir et al. .................. 455/502 |
| 7,801,108 B2 * | 9/2010 | Krasner et al. ............ 370/350 |
| 2002/0032525 A1 * | 3/2002 | Yoshikawa et al. ........ 701/213 |
| 2002/0068997 A1 | 6/2002 | Agashe et al. |
| 2002/0075942 A1 | 6/2002 | Patrick |
| 2002/0123352 A1 | 9/2002 | Vayanos et al. |
| 2002/0168988 A1 | 11/2002 | Younis |

FOREIGN PATENT DOCUMENTS

| | | |
|---|---|---|
| WO | WO 97 11384 | 3/1997 |
| WO | WO 98/09467 | 3/1998 |
| WO | WO 99/47943 | 9/1999 |
| WO | WO 00 73813 A1 | 12/2000 |
| WO | WO 00 73814 A1 | 12/2000 |
| WO | WO 01/33302 A2 | 5/2001 |
| WO | WO 02/091630 A1 | 11/2002 |

* cited by examiner

ASSOCIATING A UNIVERSAL TIME WITH RECEIVED SIGNAL

FIELD OF THE INVENTION

The invention relates generally to systems for finding the position of a terminal of a communications or other network, and more particularly to the provision of time assistance to an associated device such as a receiver of a satellite positioning system (such as GPS or Galileo). Specifically, the invention provides a method of associating a universal time with time of arrival information of an identified component of a signal at a terminal of a radio positioning system.

BACKGROUND AND PRIOR ART

Technology for positioning mobile radio terminals using the signals received from one or more transmitters has been widely used for many years. Such systems include terrestrial networks of transmitters (e.g. Loran) and networks of satellites (e.g. GPS and Galileo) deployed specifically for the purpose of locating the receiver, as well as methods that use general-purpose radio networks such as cellular mobile telephone networks (e.g. WO-A-97-11384) or TV and radio transmitter networks. (e.g. EP-A-0303371).

Within a cellular mobile telephone network, for example, the position of the terminal may be based on the identity of the serving cell, augmented by information such as the time delay between the serving transmitter and terminal, the strengths of signals received from the serving and neighbouring transmitters, or angles of incidence of received signals. An improved position may be obtained using the observed time difference of arrival (OTDA) of signals received at the terminal from two or more transmission sources.

OTDA methods give good position accuracy using only the signals available within the cellular radio network. However, they require the precise transmission time offsets between transmitters to be determined in order to solve the positioning equations. This can be done using location measuring units (LMUs) having additional receivers. LMUs are placed at known locations so that their OTDA measurements can be converted directly into a network timing model (see for example WO-A-00-73813).

Alternatively a technique (see WO-A-00-73814) may be used in which measurements of signals from a number of geographically disparate transmitters at known positions made, for example, by two geographically disparate terminals at unknown positions, may be used to compute both the positions of the terminals and all the timing offsets between the measured transmitters, without the need for LMUs.

Satellite positioning systems, such as GPS, provide an accurate solution provided that the receiver can receive sufficient satellite signals. The satellite signals are related to a common time-base of a globally defined standard time, e.g. GPS Time or Universal Coordinated Time, UTC. For example, within GPS, each satellite in the constellation has a stable atomic clock whose time is continuously measured and compared with a single reference clock located on the ground. The time of each satellite clock is steered towards alignment with the reference clock and a three-parameter model derived which describes the difference in time between the two clocks. The three parameters are up-loaded to the satellite and broadcast by the satellite as the clock correction parameters. This has the effect, after making corrections based on the parameters, of aligning the satellite clock closely with the ground-based reference clock. Satellite positioning systems work well in situations where the receiver's antenna has clear sight of the sky, but they work poorly, or not at all, inside buildings or when the view of the sky is obscured. Another problem is that they take a long time to achieve a "first fix" from a cold start and they therefore work best when they are tracking the satellite signals continuously.

In attempts to overcome these problems various proposals have been made to provide 'assistance' to satellite positioning systems. For example, U.S. Pat. No. 5,663,735 discloses the provision of an additional radio signal, by means of a separate radio receiver, incorporating a standard time or frequency and using the standard time or frequency to determine the GPS time for the time of arrival of a data bit. In another example, (see WO-A-99-47943) a mobile cellular telephone network is adapted to receive GPS signals at a base transmitter station (BTS) to allow it to calculate the position of a mobile telephone.

In a further development (see US 2002-0168988 A) a GPS unit has a position determining system (PDE) which includes a reference signal receiver, typically part of a mobile communications system, and part of a reference signal received by the reference signal receiver is transmitted to the PDE to provide additional timing data which can be used to assist the GPS unit operation.

The sending of assistance data over a link has been known in the art for many years. One of the earliest examples was provided in 1986. White Sands Missile Range Interface Control Document disclosed position reporting over a two-way communications link which allowed for the transfer of either pseudo-range or computed location based on a geodetic coordinate reference frame as defined, from time to time, in WGS84 format. ICD GPS 150, dated 1986 and issued by the US government to potential bidders for the range applications joint programme, incorporated, inter alia, support for mobile GPS receivers through transmission of ephemerides, almanac and time information. Actual use of these data formats in support of mobile GPS receivers by means of two-way datalinks has been made since 1986. A further example of assistance data is taught in U.S. Pat. No. 5,225,842 (Brown et al) filed 9 May 1991, granted 6 Jul. 1993, in which initialisation data is sent to a remote terminal (sensor) to enable the sensor to acquire and track the plurality of visible GPS satellites. The assistance data comprises initial estimates of the position of one or more objects and a satellite selection table.

Providing a satellite positioning system receiver with assistance data can enhance its performance. Furthermore, accurate timing assistance reduces the complexity of the associated chip sets. Assistance data may comprise all or some of three elements: a) satellite information, b) time aiding, and c) an estimate of the receiver's position.

Known in the art are methods by which the satellite information is provided by a server which is linked to one or more reference receivers that continually monitor the satellite signals in order to obtain the satellite information. In a GPS system, this information can also be obtained directly by the GPS receiver from the satellite signals whenever a satellite signal can be received. Time aiding may be obtained from network signals whose timings have previously been related to the satellite time base by network-based equipment. An estimate of a receiver's position may be obtained using a network positioning method, such as one based on OTDA. In all cases in the art, the assistance data is sent to the GPS receiver using a data channel provided by the mobile cellular network.

In our WO-A-00-73813 and WO-A-00-73814 (which are hereby incorporated by reference) we describe a communications system and method which constructs and maintains a timing model defining the timing relationships between transmitters in the cellular radio network. The system also computes the position of the receiver. By linking the timing of the signals from one or more transmitters of such a system to the GPS time base, this network timing model could be used to infer the timing of the signals transmitted by any transmitter in the network relative to the GPS time base and thereby provide timing assistance information to a GPS receiver. The position estimate may also be provided to the GPS receiver.

Other references describing assistance systems include U.S. Pat. No. 6,429,815 A, US 2002-0075942 A, US 2002-0068997 A, US 2002-0123352 A, WO-A-02-091630 and WO-A-01-33302.

In U.S. Pat. No. 6,445,927 (King et al.) there is described a method for computing the location of a base-station in a communications network, using measurements made by a mobile terminal of the time of arrival of communication signals from the base station with respect to GPS position information obtained from a GPS set carried within the terminal. A critical feature is that the terminal must be located in a minimum of three geographically disjoint locations before a solution can be found. The current invention is not concerned with location of the base station as that is information which is provided within the method.

In U.S. Pat. No. 6,603,978 (Carlsson et al.) there is provided a method and apparatus for providing time information assistance to a GPS receiver located in a mobile terminal via a wireless communication signal during active call sessions where the traffic and control channels are not necessarily synchronised. Unlike the current invention, this is achieved using location measurement units (LMUs) and GPS receivers associated with the base stations in the network, and time offsets are sent over the communications channel to the mobile terminal.

In a patent application published under US 2002/0168988 A1 (Younis), timing assistance is provided to a GPS set in a mobile terminal by using a reference signal (for example a public broadcast signal) which is received both in the terminal and in one or more receivers in the network. The terminal sends a snippet of the received reference signal to a network-based computing node, along with a request for GPS aiding information, where the time offset with respect to the reference signal is determined. This time offset is sent back to the terminal which uses the information to acquire GPS signals. As previously noted, the current invention does not compute any GPS time offsets in the network, and neither does it transmit such information over a communications link. Furthermore, the current invention does not transmit snippets of reference signals over a communications link.

In U.S. Pat. No. 6,084,547 a position calculation system is disclosed which uses historical information to enhance the accuracy of a radio position fix. The system latches an arriving signal to a clock counter for receiver array synchronisation but does not take advantage of or relate an arriving signal with a Universal Time, i.e. an unambiguous one with a defined start such as UTC, for example by utilising an independent oscillator in a receiver.

In summary, therefore, it is known that current systems for locating a mobile receiver using satellite positioning technology can be improved if they are supplied with accurate time aiding based on the timing of another signal, such as the signal received from the serving base station (the 'downlink') of a cellular mobile radio network. The time aiding is used by a satellite positioning receiver to reduce the range of time offsets over which it must search in order to detect a given satellite signal. The generation of accurate time aiding requires the time relationship between the satellite signals of the satellite positioning system (the satellite time base) and the downlink signals of the cellular network to be known. The timings can be measured and linked together using either LMUs installed at fixed known locations, or a network-based system such as described in WO-A-00-73813 and WO-A-00-73814. One or more GPS LMUs in the network can then be used to find the offsets between the network timings and the GPS time base. In such cases, time aiding is therefore only available when the mobile terminal has access to a properly equipped terrestrial radio network. Furthermore a significant amount of signalling and messaging is required both within the network, and between the network and the mobile terminal.

Calibrated time information, i.e. time information related accurately to a reference time such as GPS Time or UTC, can be used for many purposes. One of these, mentioned above, is to assist a GPS or other satellite positioning receiver to lock on to the signals from a particular satellite by reducing the uncertainty of the times of arrival of the signals, and hence reducing the range of time offsets over which the receiver must search in order to detect the signals. Another use of calibrated time information is in Very Long Baseline Interferometry where two radio astronomy receivers at either ends of the baseline (which may be thousands of km in length) must be synchronised with each other to within a time precision equal to the reciprocal of the receiver bandwidth (i.e. about 200 ns for a 5 MHz bandwidth).

The prior art outlined above relates generally to the provision of time aiding to a satellite positioning receiver. What is also needed is a method and apparatus within the terminal by which the time information is transferred from the communications receiver receiving the signals from the communications network to the satellite positioning receiver. This is not straightforward for several reasons.

First, the manner in which this is done in a commercial terminal must be cost-effective.

Second, there is always a processing delay between the reception of a signature in the network signal and the detection of the signal by the base-band processor in the terminal. This delay may be measured in milliseconds, and is therefore substantial when fine time aiding at the level of a few microseconds is needed. The delay may comprise both a fixed component, for example due to the execution time of a process or series of processes, and a random component which may be due to a waiting time for a required process to be triggered or for a process in execution to be completed.

Third, as the position of the mobile terminal changes, the time information has a transmission delay (time of flight component) which depends upon the relative location of the mobile terminal and the transmission source.

Fourth, it may be necessary in some systems to transfer the calibration of the received time information on the return path to the communications system for use by the system itself and by other users.

In U.S. Pat. No. 6,865,380 (EP-A-1229344) Syrjärinne teaches a method in which a pulse is directed from a communications module (e.g. a GSM receiver) along a 'special hardware path' (i.e. a wire link) to a user module (e.g. a GPS receiver) such that there are no substantial random delays. Whilst straightforward to implement, this invention fails to deal with the processing delay in the generation of the trigger pulse, so cannot be used for the provision of fine time aiding with microsecond accuracy. Nor does Syrjarinne deal with the problem of correcting the timing of the trigger pulse to compensate for motion of the communications or user module.

What is required is a method by which the failings of the prior art can be corrected. In many cases it is desirable to generate a 'marker signal', such as a trigger pulse, directly from the source of universal time such as that within a GPS receiver, rather than attempting to detect the arrival of the communications signal instantaneously.

SUMMARY OF THE INVENTION

According to the invention, in a terminal of a radio positioning system, there is provided a method of associating a universal time with time of arrival information at the terminal of an identified component of a signal, the method comprising the steps of obtaining a marker signal with an associated universal time tag from a timing device;

measuring the time or phase relationship between the marker signal and an independent oscillator;

determining time of arrival information of said identified component relative to the independent oscillator;

calculating the universal time corresponding to the time of arrival information of said identified component from said universal time tag and said measured time or phase relationship; and associating the calculated universal time with said time of arrival information.

The invention also includes a radio terminal of a radio positioning system, the terminal having a timing device for generating a marker signal whose universal time is known;

an independent oscillator; and a processor arranged to obtain the marker signal from the timing device, to measure the time or phase relationship between the marker signal and the independent oscillator, to determine time of arrival information of said identified component relative to the oscillator, to calculate the universal time corresponding to the time of arrival information of said identified component from said universal time tag and said measured time or phase relationship, and to associate the calculated universal time with said time of arrival information.

The terminal may be a terminal of a communications network, such as GSM, CDMA, CDMA 2000, W-CDMA etc., but it may also be an independent device able to receive radio signals transmitted by particular transmission sources such as broadcast television or radio, or local area network access points, or transmissions from other terminals. The scope of the invention is not limited by the nature or purpose of the radio transmissions.

The signal received by the terminal may be of any sort, as stated above, but it must contain a component for which time of arrival information can be determined. This information may be the instant of reception, or it may be a delayed time corresponding to the instant when the identified component is detected. In a particular application, the time information may be the instant corresponding to another feature of the received signal which has a definite time or phase relationship with the identified component. For example, the information may refer to the time of reception of a particular frame transition on a control channel. In the case of a GSM terminal, the identified component could be the Extended Training Sequence (ETS) carried on the Broadcast Control Channel (BCCH). W-CDMA terminals could use the data word of the Primary Synchronisation Channel.

The time of arrival information may refer to the predicted future time of arrival of an identified component of the received signal, such as a component as mentioned in the immediately preceding paragraph, either in the case in which the identified component is repetitive, or in which the arrival of the said identified component has been predicted by the previous arrival of another identified component.

In general, there is a requirement to enable terminals of a communications network to synchronise with the signals received from a base transceiver station of the network, and so synchronisation patterns of this sort are usual. In the case of other transmission sources such as used for television, the identified component may be a transmission marker such as a frame or line synchronisation pulse, or it may be a component of the modulation inserted specifically for this purpose. In some circumstances, the entire transmission source may be pulsed, so that the identified component in this case may be the next or a future pulse received by the terminal. In these cases, the identified components are repetitive. The ETS, for example, repeats at about 50 ms intervals. However, the repetition of an identified component is not a necessary requirement of the invention, and a single pulse, identifier, or other component could be used.

The use of a repetitive identified component allows for averaging of several measurements of time of arrival information to produce a better estimate of a future, current, or past event. Having established the timing of the received signals in this way, the method of the invention may be used in an application for measuring perturbations in the incoming signals, for example in timing caused by transmission or path variations, or as an integrity check.

The timing device may be any device which is able to generate a marker signal whose universal time is known. For example, the terminal may contain a satellite receiver able to receive the signals transmitted by satellites of a positioning system such as GPS or Galileo. In this case, the satellite receiver is able to generate time markers aligned with the satellite time base, once it has obtained a full position and time solution, e.g. GPS time or, after correction for a known offset, Universal Coordinated Time (UTC). These markers may be ticks or pulses at regular intervals, or they may be single markers sent on request.

The marker signal may be an identifiable transition, such as the arrival of a data word or a change in state of a binary logic device, or a flag in a software program running on a processor, or the point at which at least one particular analogue value is reached, for example in a phase-measuring device.

The universal time tag associated with a marker signal generated by the timing device specifies the universal time of the marker itself. The tag may be a message or a data word sent between software programs running on one or more processors, or it may be obtained from a register, for example one counting up from a pre-determined starting point, or it may be obtained from a clock kept in alignment with the universal time by the timing device. The time tag may be generated in advance, coincident with, or after the marker signal.

The time-tag may specify a universal time which is incorrect (i.e. not within the expected error range of the measurement). This may be the case, for example, when the timing device has just been turned on, or when it has temporarily lost the means for keeping it synchronised, e.g. because of loss of signal reception. The invention may then be applied to establish the error in the time marker in the case in which the universal time of the receipt of the identified component is already known. This may be because of a previous association/calibration using the invention or through other means such as information supplied over a communications link or by another timing device, remote or local, associated with the terminal. The method of WO-A-2005/071430 describes calibrating un-calibrated time information within a mobile terminal having one or more receivers.

Preferably, the independent oscillator is a free-running oscillator. The independent oscillator acts as a time base and may be any oscillator associated with the terminal. The marker signal may be measured relative to the phase of the independent oscillator and, in a particular implementation, the phase may be determined by the use of a counter triggered by the oscillator. The counter may be any counter, e.g. a hardware device or software component running on a processor. The rate at which the count changes, either upwards or downwards, must be known or it may be measured or calculated.

A frequency error in the independent oscillator driving the counter will always introduce an error in the estimate of the time of arrival of the identified component with respect to the time marker. If better precision is required, two time marker signals and their time tags, separated by an appropriate time interval, can be provided by the timing device. The respective differences in the oscillator phases or the counter states can then be used to calculate the oscillator frequency. The calculated oscillator frequency may then be used to correct for the error in the estimated time of arrival information.

In the case of a GSM terminal, the counter could be a quarter-bit counter which runs at four times the bit rate and is driven by a clock signal derived from the terminal's crystal oscillator. There is no requirement for the counter to be synchronised with the received signal.

In another implementation, the independent oscillator phase may be measured with a digital or analogue phase-locked loop.

The instant of reception of the identified component need not be measured immediately, and in general it may be convenient not to do so. For example, in a GSM terminal using the ETS as the identified component, the base-band data stream is often buffered, and the cross-correlation carried out digitally some time after the instant of reception. This processing delay, which may not be constant, may not matter in practice depending on the particular application of the invention, as it may be removed by calibration. However, in some applications, it may be convenient to tag each sample of the base-band data stream using the instantaneous count value of the independent oscillator so that, once the identified component has been detected, the moment of reception may be referred back to a point before the buffering and processing. There may also be a delay associated with the analogue parts of the communications receiver, but this may be much smaller, may be constant in practice, and may be removed if necessary by calibration.

The calculation to associate the universal time with the time of arrival information of the identified component is straightforward and is illustrated by the following example. A terminal contains an independent oscillator driving a counter running at 1 MHz. A GPS receiver generates a marker signal at universal time τ (specified in seconds). The counter state at this point is measured to be N. The receipt of an identified component of the signal received by the terminal is determined by the process which detects and measures the identified component to be at counter state M (which can be a non-integer value). Then the universal time of the receipt of the identified component is given by T where $$T = \tau + \frac{M-N}{f} s, \quad (1)$$

where f is $10^6$.

In some applications of the invention, it may be preferable to supply a marker signal to the timing device, rather than vice versa as described above.

According to a second aspect of the invention, in a terminal of a radio positioning system, there is provided a method of associating a universal time with time of arrival information at the terminal of an identified component of a signal, the method comprising the steps of obtaining a marker signal from an independent oscillator;

assigning a universal time tag to the marker signal;

determining time of arrival information of said identified component relative to the independent oscillator;

calculating the universal time corresponding to the time of arrival information of said identified component from said universal time tag and said determined relative time of arrival information; and associating the calculated universal time with said time of arrival information.

The marker signal may be generated, for example whenever the state of the independent oscillator (e.g. its accumulated phase) matches a preset value, using a counter driven by the oscillator which may be a free-running oscillator. The marker signal may be a pulse lasting one clock cycle which occurs when the counter passes through its full count, or resets back to zero, or a particular counter bit changes from 'zero' to 'one'. Many schemes are possible, and the marker signal can be generated once or regularly, but in each case it is necessary to know the state of the counter, and hence the state of the independent oscillator, at which a particular marker signal is generated.

The marker signal may be sent to a timing device, such as a GPS receiver as described above, where it is assigned a time tag.

The second aspect of the invention also includes a radio terminal of a radio positioning system, the terminal having
a timing device generating a universal time-tag;
an independent oscillator; and
a processor arranged to obtain a marker signal from the independent oscillator, to assign the universal time tag to the marker signal, to determine time of arrival information of said identified component relative to the oscillator, to calculate the universal time corresponding to the time of arrival information of said identified component from said universal time tag and said measured time or phase relationship; and to associate the calculated universal time with said time of arrival information.

BRIEF DESCRIPTION OF THE DRAWINGS

The invention and examples of the system in which it may be deployed will now be further described with reference to the accompanying drawings, in which:—

DETAILED DESCRIPTION OF THE EXAMPLES

Figure 1:
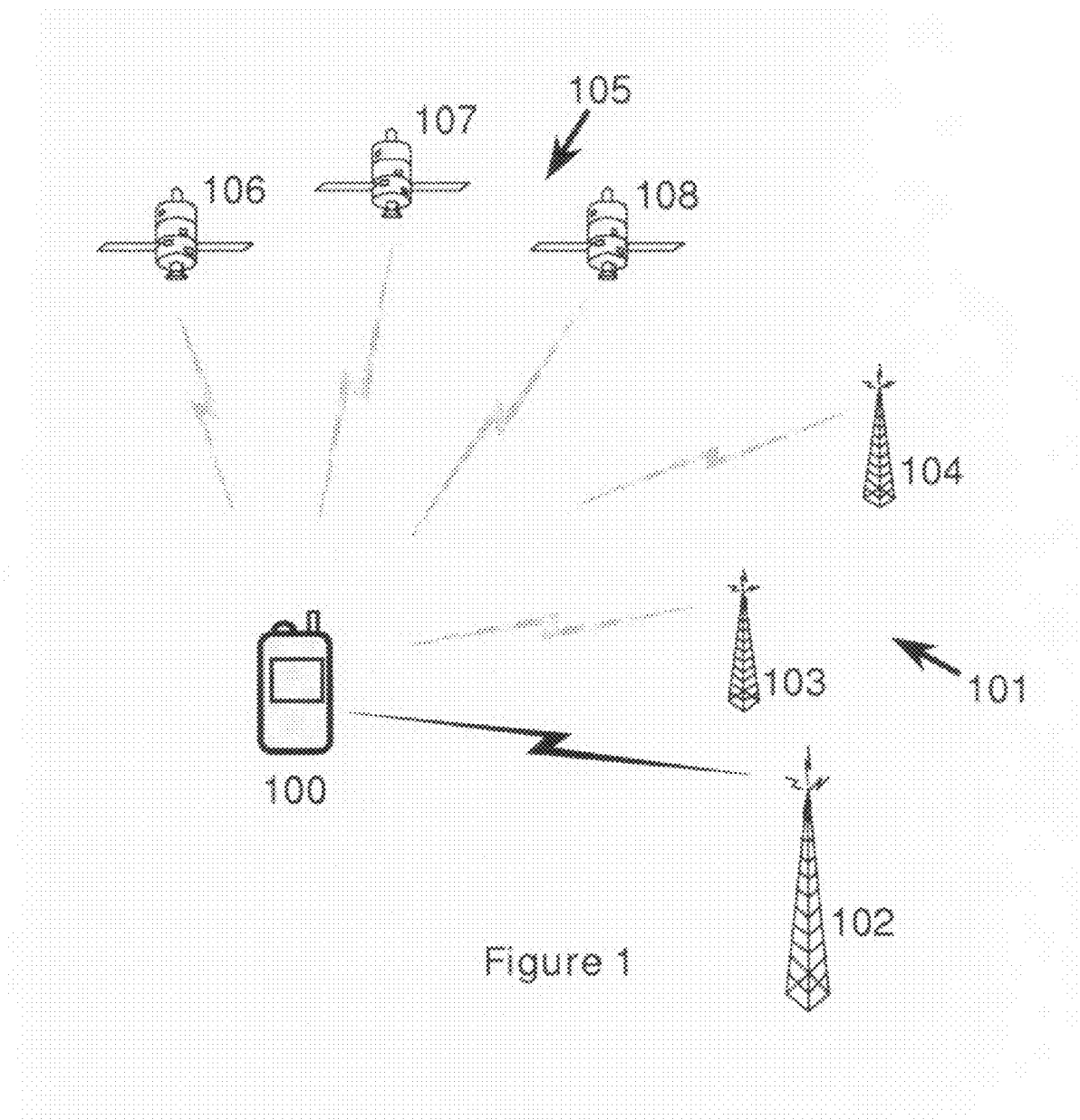
FIG. 1 illustrates a system having a terminal of a communications network, base transceiver stations, and GPS satellites.

FIG. 1 shows a terminal 100 of a GSM communications network 101 with associated serving base transceiver station 102 and neighbouring base transceiver stations 103 and 104. The terminal 100 has a communications module including a receiver 201 for receiving the transmissions from the network 101, but it also has a receiver 208 for receiving GPS signals from a satellite positioning system 105, specifically from the satellites 106, 107,108 etc.

Figure 2:
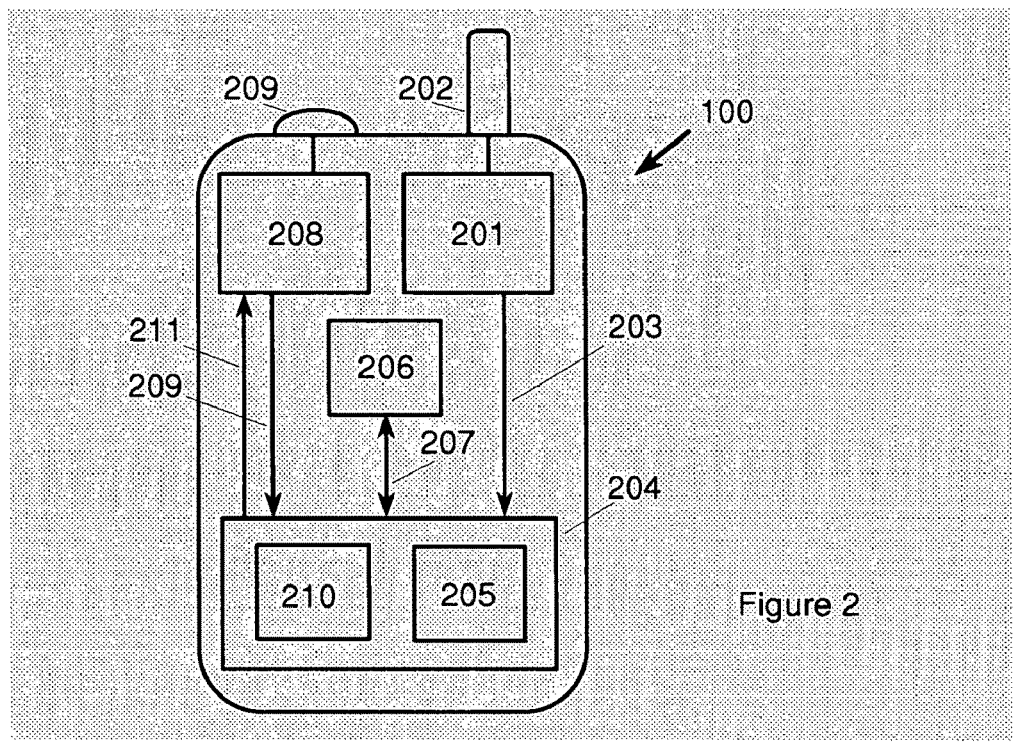
FIG. 2 shows a terminal embodying the invention.

The terminal 100 is shown in more detail in FIG. 2. The receiver 201 of the communications module receives the signals from communications network 101 via an antenna 202, and transfers base-band I and Q samples (i.e. in-phase and quadrature-phase) via link 203 to a processor 204. The processor is running a software program 205 which is able to recognise the arrival of an identified component in the signal, in this case the ETS. The processor 204 receives clock signals, count data, and pulses from counter 206 via a bi-directional link 207. The GPS receiver 208 receives its signals from satellites 106, 107,108 etc. via an antenna 209, and it communicates with the processor 204 via links 209 and 211. A software program 210, also running on processor 204, carries out the method of the invention, i.e. it associates a universal time with the receipt by the terminal of an ETS.

Figure 3:
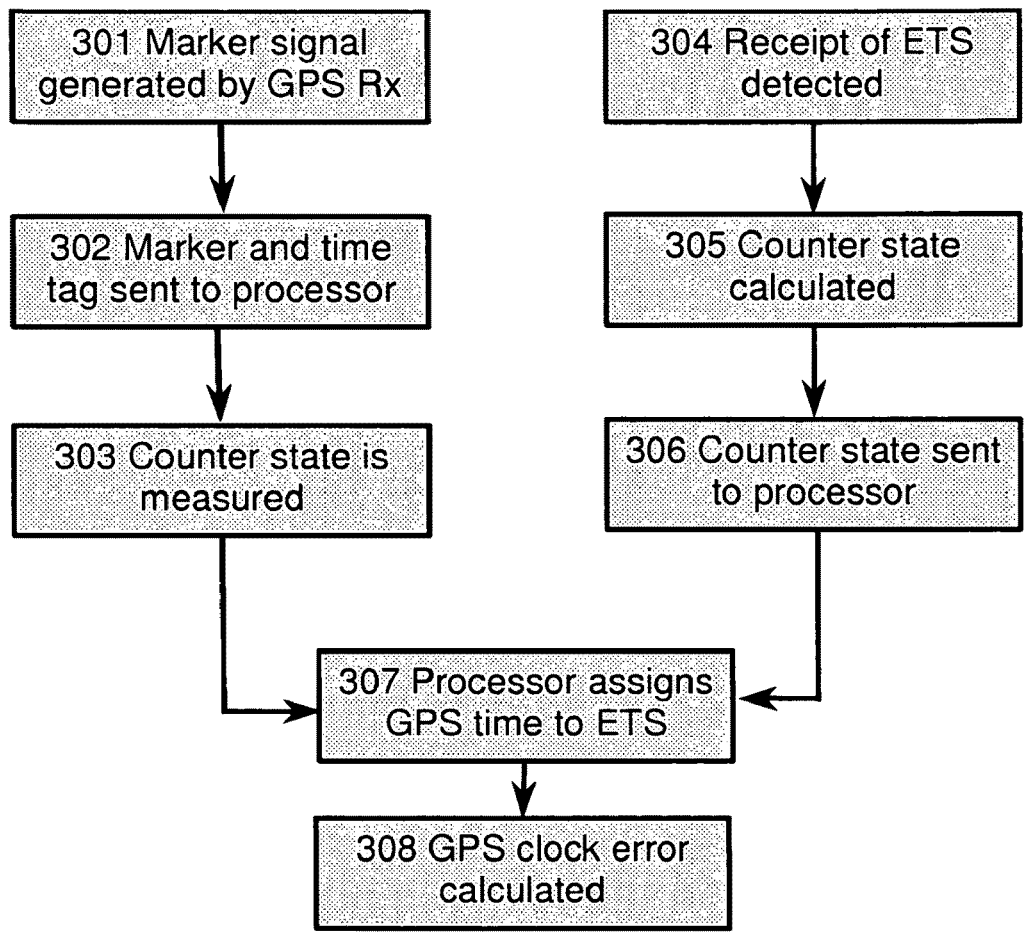
FIG. 3 gives a flow diagram of the first aspect of the invention.

An example of the method of the invention is illustrated with reference to the flow diagram shown in FIG. 3. The GPS receiver 208 generates a marker signal in step 301 along with an associated time tag. This labels the marker signal with the GPS time. If the GPS receiver has obtained a full position and time solution recently (usually requiring the signals from at least four satellites to be received), the time tag will be accurate. However, as noted below, the time tag may be in error. The marker signal, a pulse in this case, and time tag is sent via link 209 to the software program 210 running on processor 204 (step 302). The processor responds by reading the state of the counter 206 (step 303), which in this case is a 16-bit sequential up-counter with a clock-rate of 1 MHz. The counter state is the value of N in equation 1.

Meanwhile, asynchronously with steps 301 to 303, communications receiver 201 receives an ETS in step 304 (these occur every 50 ms or so) and passes the corresponding base-band I & Q samples to processor 204 via link 203. The counter 206 periodically interrupts the processor 205, which responds by associating the counter state with the corresponding I & Q samples. The program 205 performs a complex cross-correlation with the ETS template, and then an interpolation, so that after the calculation it has a value for the instant of arrival of the ETS relative to the counter with sub-count accuracy (step 305). This value, equal to M in equation 1, is passed in step 306 to software program 210.

The software program 210 can now calculate the GPS time of the ETS (step 307) using equation 1. It is assumed that the rate of counter 206 is exactly 1 MHz. Provided that the time elapsed between the generation of the marker signal and the arrival of the ETS is small enough, the counter rate error can be ignored. If better precision is required, two marker signals separated by an appropriate time interval, and their time tags, $\tau_1$ and $\tau_2$, can be provided by GPS receiver 208. The respective differences in the counter states, $C_1$ and $C_2$, can then be used to calculate the counter rate according to the following equation $$f_c = \frac{C_1 - C_2}{\tau_1 - \tau_2}, \qquad (2)$$

and the value of $f_c$ is used in place of f in equation (1).

The method of the invention may also be used to provide the GPS receiver with the GPS time for assistance in acquisition or re-acquisition of satellite signals. In this case, it is assumed that software program 210 has access to a calibration of the ETS signal with respect to GPS time, either from having performed a recent calibration as above, or from information sent from elsewhere (e.g. from a server in the network 101). The processor may then make the extra step 308 in which it calculates the difference between the GPS time tag supplied by the GPS receiver in step 301 and the GPS time calculated from the arrival of the ETS and the calibration information. This can be supplied to the GPS receiver via link 211 as the clock error. This calculation of the clock error could instead be carried out inside the GPS receiver. In this case, the universal time calculated from the receipt of the ETS and calibration information is supplied to the GPS receiver.

Figure 4:
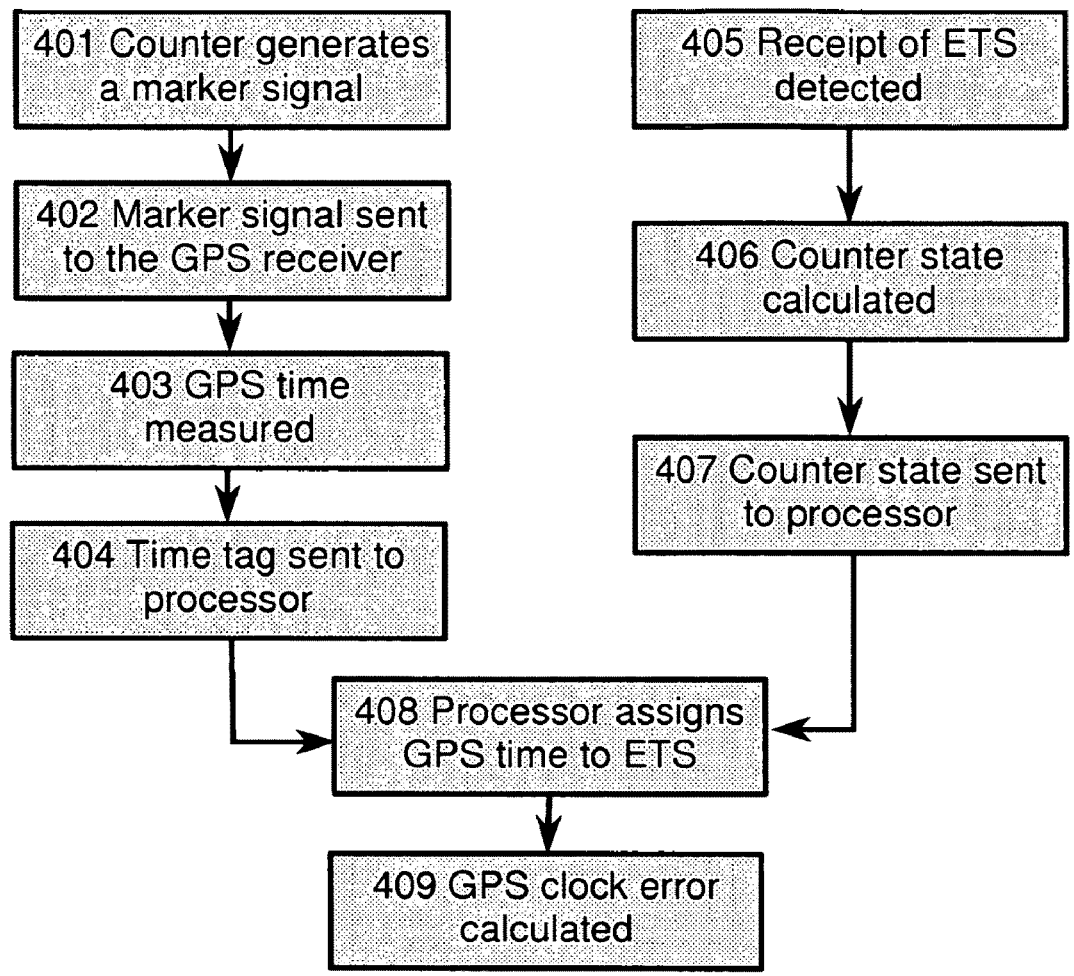
FIG. 4 gives a flow diagram of the second aspect.

An example of the method of the second aspect of the invention is illustrated with reference to the flow diagram shown in FIG. 4. The counter 206 is a 16-bit sequential up-counter and it generates a marker signal, in this case a pulse, step 401, whenever its count transitions from a full-count of 65,535 to zero. Its clock-rate is 1 MHz, so these pulses occur approximately every sixty-five ms. The pulse is provided to GPS receiver 208 via links 207 and 211 (step 402) where the GPS receiver measures the GPS time (step 403). In this case, the GPS receiver has been primed to expect a pulse, and it has calculated a full position-and-time solution so that its internal clock is calibrated to GPS time (the universal time in this example). The arrival of the marker signal pulse via link 211 latches a register at the current GPS time, and this is read and passed back to processor 204 via link 209 as the time tag (step 404).

Meanwhile, asynchronously with steps 401 to 404, communications receiver 201 receives an ETS in step 405 and passes the corresponding base-band I & Q samples to processor 204 via link 203. The counter 206 periodically interrupts the processor 205, which responds by associating the counter state with the corresponding I & Q samples. The program performs a complex cross-correlation with the ETS template, and then an interpolation, so that after the calculation it has a value for the instant of arrival of the ETS relative to the counter with sub-count accuracy (step 406). This value is passed, step 407, to software program 210.

The software program 210 can now calculate the GPS time of the ETS (step 408) using equation 1. It is assumed that the rate of counter 206 is exactly 1 MHz. As in the first example above, the actual frequency could be determined using two successive marker signals from counter 206 measured by GPS receiver 208, and the counter rate deduced from the difference in the GPS times and the change in the counter state between one pulse and the next (65,536 in this example).

The method of the invention may also be used to provide the GPS receiver with the GPS time for assistance in acquisition or re-acquisition of satellite signals. In this case, it is assumed that software program 210 has access to a calibration of the ETS signal with respect to GPS time, either from having performed a recent calibration as above, or from information sent from elsewhere (e.g. from a server in the network 101). The processor may then make the extra step 409 in which it calculates the difference between the GPS time tag supplied by the GPS receiver in step 404 and the GPS time calculated from the arrival of the ETS and the calibration information. This can be supplied to the GPS receiver via link 211 as the clock error. The calculation of clock error could instead be carried out inside the GPS receiver. In this case, the universal time calculated from the receipt of the ETS and calibration information is supplied to the GPS receiver.

The invention claimed is:

1. A method of associating a universal time with time of arrival information of an identified component of a signal at a terminal of a radio positioning system, the method comprising the steps of obtaining a marker signal with an associated universal time tag from a timing device;

measuring the timing relationship between the marker signal and an independent oscillator that is independent of the timing device;

determining time of arrival information of said identified component relative to the independent oscillator;

calculating the universal time corresponding to the time of arrival information of said identified component from said universal time tag and said measured timing phase relationship; and associating the calculated universal time with said time of arrival information.

2. A method of associating a universal time with time of arrival information of an identified component of a signal, the method comprising the steps of obtaining a marker signal from an independent oscillator;

assigning a universal time tag from a timing device to the marker signal, the independent oscillator being independent of the timing device;

determining time of arrival information of said identified component relative to the independent oscillator;

calculating the universal time corresponding to the time of arrival information of said identified component from said universal time tag and said determined relative time of arrival information; and associating the calculated universal time with said time of arrival information.

3. A method according to claim 1 or claim 2, wherein the time of arrival information is the instant of reception or a delayed time corresponding to the instant when the identified component is detected.

4. A method according to claim 1 or claim 2, wherein the time of arrival information relates to the predicted future time of arrival of an identified component of the received signal.

5. A method according to claim 1 or claim 2, wherein a plurality of measurements of time of arrival information are combined to produce a better estimate of a future, current, or past event.

6. A method according to claim 1 or claim 2, wherein the marker signal is an identifiable transition, such as the arrival of a data word or a change in state of a binary logic device, or a flag in a software program running on a processor, or the point at which at least one particular analogue value is reached in a phase-measuring device.

7. A method according to claim 1 or claim 2, wherein the universal time tag associated with a marker signal generated by the timing device specifies the universal time of the marker itself.

8. A method according to claim 1 or claim 2, wherein the tag is a message or a data word sent between software programs running on one or more processors.

9. A method according to claim 1 or claim 2, wherein the tag is obtained from a register or a clock kept in alignment with the universal time by the timing device.

10. A method according to claim 1 or claim 2, wherein the time-tag specifies a universal time which is incorrect and the error in the time marker is determined in the case in which the universal time of the receipt of the identified component is already known.

11. A method according to claim 1 or claim 2, wherein the marker signal is measured relative to the phase of the independent oscillator.

12. A method according to claim 11, wherein the phase is determined by the use of a counter triggered by the independent oscillator.

13. A method of finding the position of a terminal of a communications network which includes the method of claim 1 or claim 2.

14. A method of associating a universal time with time of arrival information of an identified component of a signal at a terminal of a radio positioning system, the method comprising the steps of obtaining a marker signal with an associated universal time tag from a timing device;

measuring the timing relationship between the marker signal and an independent oscillator;

determining time of arrival information of said identified component relative to the independent oscillator;

calculating the universal time corresponding to the time of arrival information of said identified component from said universal time tag and said measured timing phase relationship; and associating the calculated universal time with said time of arrival information;

wherein two time marker signals and their time tags, separated by an appropriate time interval, are provided by the timing device, the respective difference in the independent oscillator phases or the counter states is then used to calculate the oscillator frequency, and the calculated oscillator frequency used to correct for the error in the estimated time of arrival information.

15. A radio terminal of a radio positioning system, the terminal having a timing device for generating a marker signal whose universal time is known;

an independent oscillator that is independent of the timing device; and a processor arranged to obtain the marker signal from the timing device, to measure the timing relationship between the marker signal and the independent oscillator, to determine time of arrival information of said identified component relative to the oscillator, to calculate the universal time corresponding to the time of arrival information of said identified component from said universal time tag and said measured timing phase relationship; and to associate the calculated universal time with said time of arrival information.

16. A radio terminal of a radio positioning system, the terminal having a timing device generating a universal time-tag;

an independent oscillator that is independent of the timing device; and a processor arranged to obtain a marker signal from the independent oscillator, to assign the universal time tag to the marker signal, to determine time of arrival information of said identified component relative to the oscillator, to calculate the universal time corresponding to the time of arrival information of said identified component from said universal time tag and said determined relative time of arrival; and to associate the calculated universal time with said time of arrival information.

17. A radio terminal according to claim 15 or claim 16, which comprises a terminal of a communications network.

18. A radio terminal according to claim 15 or claim 16, wherein the independent oscillator is a free-running oscillator.

19. A radio terminal according to claim 15 or claim 16, wherein the marker signal is measured relative to the phase of the independent oscillator in the processor.

20. A radio terminal according to claim 19, the processor including a counter triggered by the independent oscillator, to determine the phase.

21. A radio terminal according to claim 20, wherein the counter is a hardware device.

22. A radio terminal according to claim 20, wherein the counter is a software component running in the processor.

23. A method of associating a universal time with time of arrival information of an identified component of a signal, the method comprising the steps of obtaining a marker signal from an independent oscillator;

assigning a universal time tag to the marker signal;

determining time of arrival information of said identified component relative to the independent oscillator;

calculating the universal time corresponding to the time of arrival information of said identified component from said universal time tag and said determined relative time of arrival information; and associating the calculated universal time with said time of arrival information;

wherein two time marker signals and their time tags, separated by an appropriate time interval, are provided by the timing device, the respective difference in the independent oscillator phases or the counter states is then used to calculate the oscillator frequency, and the calculated oscillator frequency used to correct for the error in the estimated time of arrival information.

* * * * *